US012715267B2

(12) United States Patent
Stevenson

(10) Patent No.: US 12,715,267 B2
(45) Date of Patent: Aug. 25, 2026

(54) AIR CURTAIN FOR DISPELLING PARTICULATES FROM A VEHICLE

(71) Applicant: Rivian IP Holdings, LLC, Plymouth, MI (US)

(72) Inventor: Thomas James Stevenson, Radford Semele (GB)

(73) Assignee: Rivian IP Holdings, LLC, Irvine, CA (US)

( * ) Notice: Subject to any disclaimer, the term of this patent is extended or adjusted under 35 U.S.C. 154(b) by 720 days.

(21) Appl. No.: 18/057,532

(22) Filed: Nov. 21, 2022

(65) Prior Publication Data

US 2024/0166023 A1 May 23, 2024

(51) Int. Cl.
*B60H 1/24* (2006.01)
*B60H 1/00* (2006.01)

(52) U.S. Cl.
CPC ............. *B60H 1/248* (2013.01); *B60H 1/008* (2013.01); *B60H 1/244* (2013.01); *B60H 1/00364* (2013.01)

(58) Field of Classification Search
CPC ........ B60H 1/748; B60H 1/008; B60H 1/744; B60H 1/00364
USPC ........................................................... 454/75
See application file for complete search history.

(56) References Cited

U.S. PATENT DOCUMENTS

| | | | | | |
|---|---|---|---|---|---|
| 4,666,204 | A * | 5/1987 | Reinholtz | B62D 47/02 | 296/22 |
| 4,867,047 | A * | 9/1989 | Citron | B60H 1/00464 | 454/162 |
| 6,012,297 | A * | 1/2000 | Ichishi | B60H 1/00871 | 165/203 |
| 7,690,210 | B2 * | 4/2010 | Yamaguchi | B60H 3/0608 | 454/75 |
| 9,057,528 | B2 * | 6/2015 | Browne | B60J 9/04 | |
| 9,688,194 | B2 * | 6/2017 | MacNeille | B60Q 9/00 | |
| 2009/0102231 | A1 * | 4/2009 | Atcravi | B60P 3/34 | 296/175 |
| 2018/0058996 | A1 * | 3/2018 | Johnston | G01N 1/2226 | |
| 2022/0056824 | A1 * | 2/2022 | Varughese | F01P 11/14 | |

OTHER PUBLICATIONS

"Household Use of Solid Fuels and High-temperature Frying", IARC Monographs on the Evaluation of Carcinogenic Risks to Humans, World Health Organization, International Agency for Research on Cancer, vol. 95, pp. 1-444 (Oct. 10-17, 2006).

(Continued)

*Primary Examiner* — Avinash A Savani
*Assistant Examiner* — Dana K Tighe
(74) *Attorney, Agent, or Firm* — Patterson + Sheridan, LLP

(57) ABSTRACT

A method comprises detecting particulates generated from a cooking device of a vehicle. In response to detecting the particulates from the cooking device, a heating, ventilation, and air conditioning (HVAC) system of the vehicle is activated. This causes the HVAC system to dispel the particulates from the vehicle. Aspects also include lowering a window and repositioning air vents of the HVAC system to further facilitate dispelling particulates and helping to prevent particulates from entering the vehicle during use of the cooking device.

5 Claims, 14 Drawing Sheets

(56) References Cited

OTHER PUBLICATIONS

"Laminar Flow—Applications | Laminar Flow Diffusers", Critical Environment, Anemostat, Retrieved from the internet URL : https://www.anemostat-hvac.com/literature/laminar_flow_app.pdf, accessed on Dec. 14, 2022, pp. 6.

Blankenship, D., "Rivian HVAC Vents in action", YouTube, Retrieved from Internet URL : https://www.youtube.com/watch?v=aZWjkNOb69s, accessed on Dec. 14, 2022, pp. 2.

* cited by examiner

AIR CURTAIN FOR DISPELLING PARTICULATES FROM A VEHICLE

Cooking activities can be performed with a vehicle. However, it is preferable to expel particulates created during the cooking process from the vehicle. Some conventional cooking devices are found in RVs (recreational vehicles), and some of these systems include a vent hood for filtering air that incudes cooking particulates.

SUMMARY

At a high level, the technology described herein includes systems and methods for dispelling cooking particulates from a vehicle using the vehicle's HVAC (heating, ventilation, and air conditioning) system.

For instance, a particulate sensor can be disposed within a vehicle. The particulate sensor detects particulates emitting during a cooking process. Such particulates may include airborne oil or water particles, smoke, and the like. Upon detecting particulates at the particulate sensor, a control system activates an HVAC system. In particular, air can be pushed through the HVAC system to air vents, thereby increasing the air pressure within the vehicle relative to external ambient air. This causes internal vehicle air to flow out of the vehicle, thereby dispelling the airborne particulates and helping to prevent other particulates from entering the vehicle.

To enhance air movement out of the vehicle and increase the rate at which cooking particulates are dispelled, the control system can open a window in response to detecting the particulates to allow ambient air into the vehicle. The opened window is located at a first end of the vehicle opposite a second end of the vehicle where the particulates are to be dispelled at an opening, such as a rear opening. The control system may further activate an air vent motor to position an air vent so that the air is directed toward the opening, thereby helping to move vehicle air with the particulates outward through the opening.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1A:
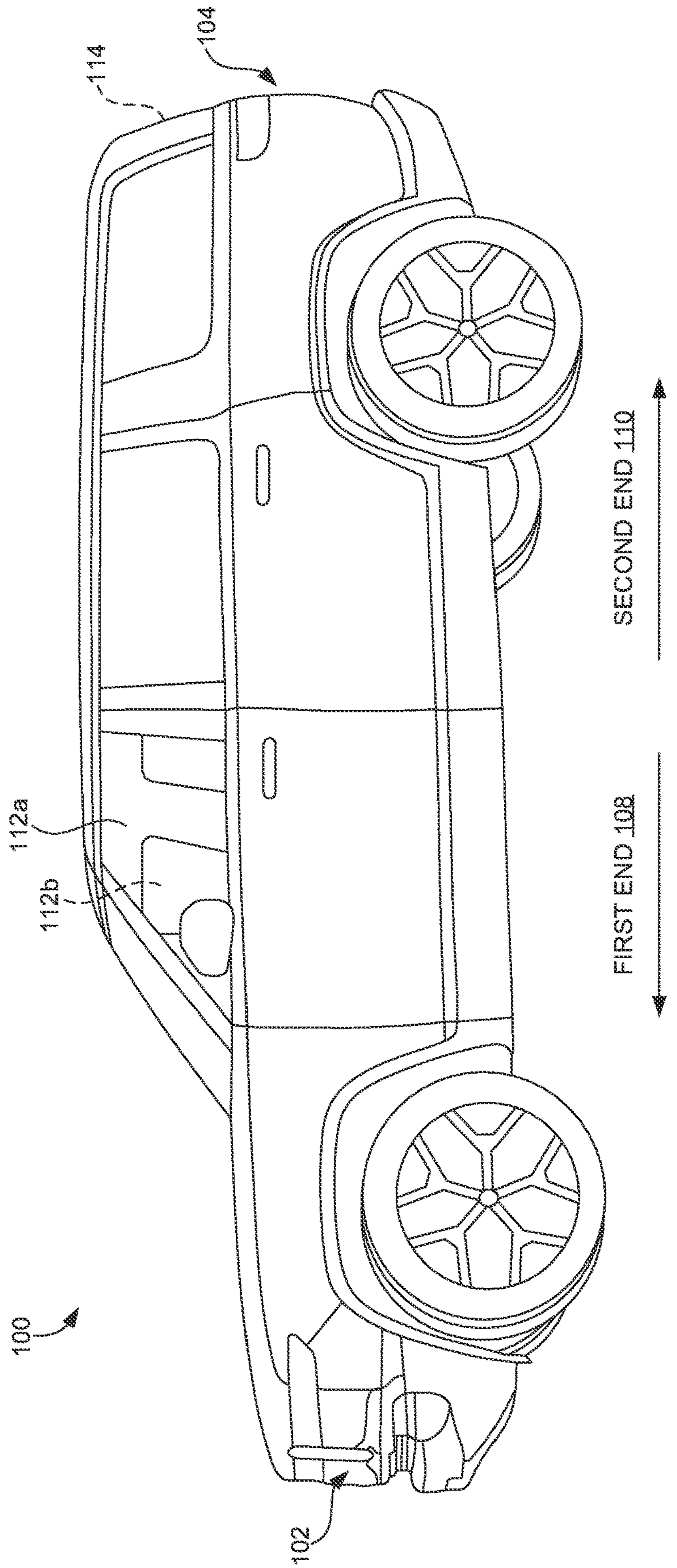
FIG. 1A is a side view of an example vehicle suitable for implementing the technology, in accordance with an aspect described herein.

Outdoor cooking activities, such as cooking over a campfire, or using a portable cooking device or stove, can sometimes generate airborne particulates, such as aerosolized oil, steam, smoke, at the like. When cooking near a vehicle, these particulates may enter the vehicle through an opening, such as a window, door, hatch, or the like. The technology presented herein helps to reduce cooking particulates within the vehicle and further helps to reduce the propensity of particulates entering the vehicle when cooking.

One example system suitable for doing this detects particulates and uses the vehicle's HVAC system to dispel them. For instance, particulates from cooking are detected within the vehicle at a particulate sensor. The particulate sensor is communicatively coupled to a control system. When particulates are detected, the control system activates the vehicle's HVAC system. In doing so, air is moved through the HVAC system and blown from air vents within the vehicle. This increases the air pressure within the vehicle, thereby inducing a positive air pressure within the vehicle relative to ambient air outside of the vehicle. In turn, this causes vehicle air comprising the particulates to flow out of the vehicle at an opening, such as an opening at the rear of the vehicle.

The control system is operationally coupled to a window motor and an air vent motor, allowing a controller of the control system to modify positions of a window or an air vent to further help dispel particulates from vehicle air and to help prevent particulates from entering the vehicle. Notably, dispelling particulates from a vehicle may include removing particulates from a vehicle cabin, preventing particulates from entering a vehicle cabin, a combination of these scenarios, among other possibilities contemplated herein. For instance, in response to detecting particulates, the control system can activate the window motor to at least partially open the window of the vehicle. The window selected for opening can be at an end of the vehicle opposite that of an opening from which particulates are entering and which particulates are being dispelled. For example, a front window can be at least partially opened in response to detecting particulates are entering the vehicle at a rear opening. This helps move air from the front of the vehicle out through the rear of the vehicle, both preventing and dispelling particulates. In addition to or in lieu of opening the window, the controller can modify an air vent position so that air is being directed toward the opening at which particulates are being dispelled. This helps direct air being blow from the air vent toward the opening, thereby causing vehicle air comprising the particulates to also flow toward and out of the opening.

The aforementioned embodiments have been provided as examples of the technology that may be practiced from the present disclosure. They are intended to be examples and are provided to aid in understanding the technology and its benefits. Additional features and embodiments are further described with reference to the figures.

Turning now to FIG. 1A, FIG. 1A illustrates an example vehicle 100 that is suitable for employing aspects of the present technology. While vehicle 100 is illustrated as an SUV (sport utility vehicle), the drawing is intended to be illustrative. The technology described herein may also be suitable for use with other vehicles, such as cars, trucks, semi-trucks, vans, buses, tractors, and the like. As such, it is intended that the term "vehicle" be interpreted broadly to generally include any motorized transportation unit.

Vehicle 100 generally comprises front aspect 102 that is opposite rear aspect 104. Terms such as "front" and "rear" and other terms of orientation with respect to vehicle 100 will be understood by one of ordinary skill to refer to the common and general understanding in the field. In this example, vehicle 100 generally comprises first end 108 opposite second end 110. In this example first end 108 and second end 110 are separated by a theoretical midline of vehicle 100.

First end 108 comprises front aspect 102 along with front windows, such as window 112*a* and window 112*b*. As will be further described, window 112*a* and window 112*b* may be power windows that are operationally opened and closed through activation of a window motor. Second end 110 comprises rear aspect 104 along with rear opening 114. Rear opening 114 may be located at rear aspect 104 as illustrated, or positioned at another location within second end 110.

As noted, vehicle 100 is intended to be only an example. It should be appreciated that other vehicles may comprise different arrangements of components, such as windows, doors, hatches, wheels, trunks, hoods, lights, and so on. For brevity and clarity, many of these components have not been described in detail. Moreover, various vehicle arrangements may comprises more or fewer components than those described. The technology described herein is also suitable for use with many other vehicles and should be understood as such.

Figure 1B:
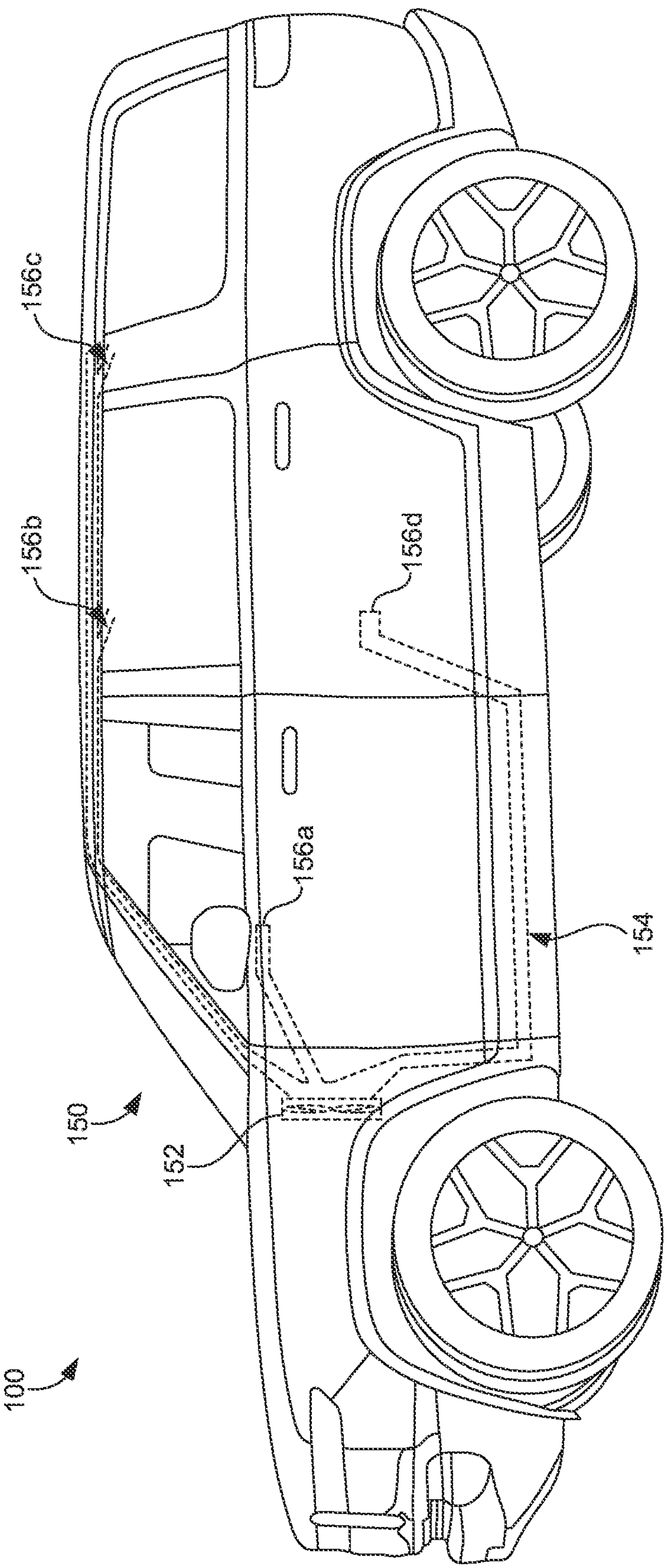
FIG. 1B is a side view of the vehicle of FIG. 1A and illustrates an example HVAC system, in accordance with an aspect described herein.

Referring now to FIG. 1B, vehicle 100 may comprise HVAC system 150. For instance, HVAC system 150 may move air through vehicle 100 to air vents, where the air is blown into the interior of vehicle 100. HVAC system 150 may comprise, among other components, cooling units, such as compressors, or heating elements to adjust the temperature or humidity of the air being moved through HVAC system 150. These may be connected to blower 152 that circulates air through various ducts forming ductwork 154. Ductwork 154 generally terminates at air vents, as will be further described, to distribute air within the interior of vehicle 100. In the example illustrated by FIG. 1B, ductwork 154 terminates at locations 156*a*-156*d*, which correspond to air vent locations within vehicle 100. HVAC system 150 may pull external air and blow the conditioned external air into the interior or recirculate vehicle air from the interior, or both. As will be described, components of HVAC system 150 may be under operational control of a controller of a control system. Any HVAC system, with more or fewer components, in any arrangement, is intended to be within the scope of this disclosure.

Figure 2:
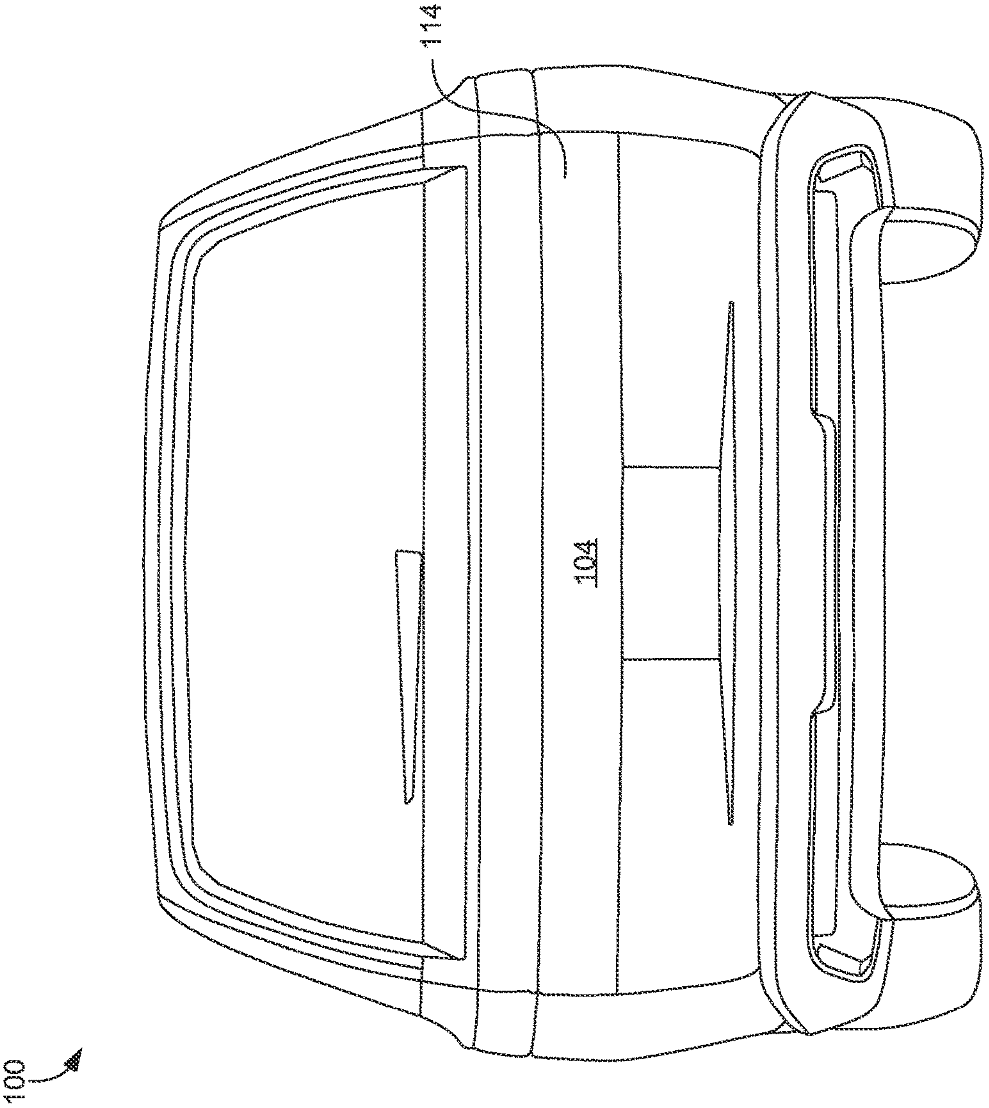
FIG. 2 is a rear view of the example vehicle of FIG. 1A, in accordance with an aspect described herein.

FIG. 2 illustrates a rear view of rear aspect 104 of vehicle 100. Rear aspect 104 comprises rear opening 114. Rear aspect 104 generally provides access to a vehicle interior at rear aspect 104. Here, rear opening 114 is accessible via a rear door. In other aspect, rear opening 114 may be accessible via a tailgate, window, door, hatch, and the like, or any combination thereof.

Figure 3:
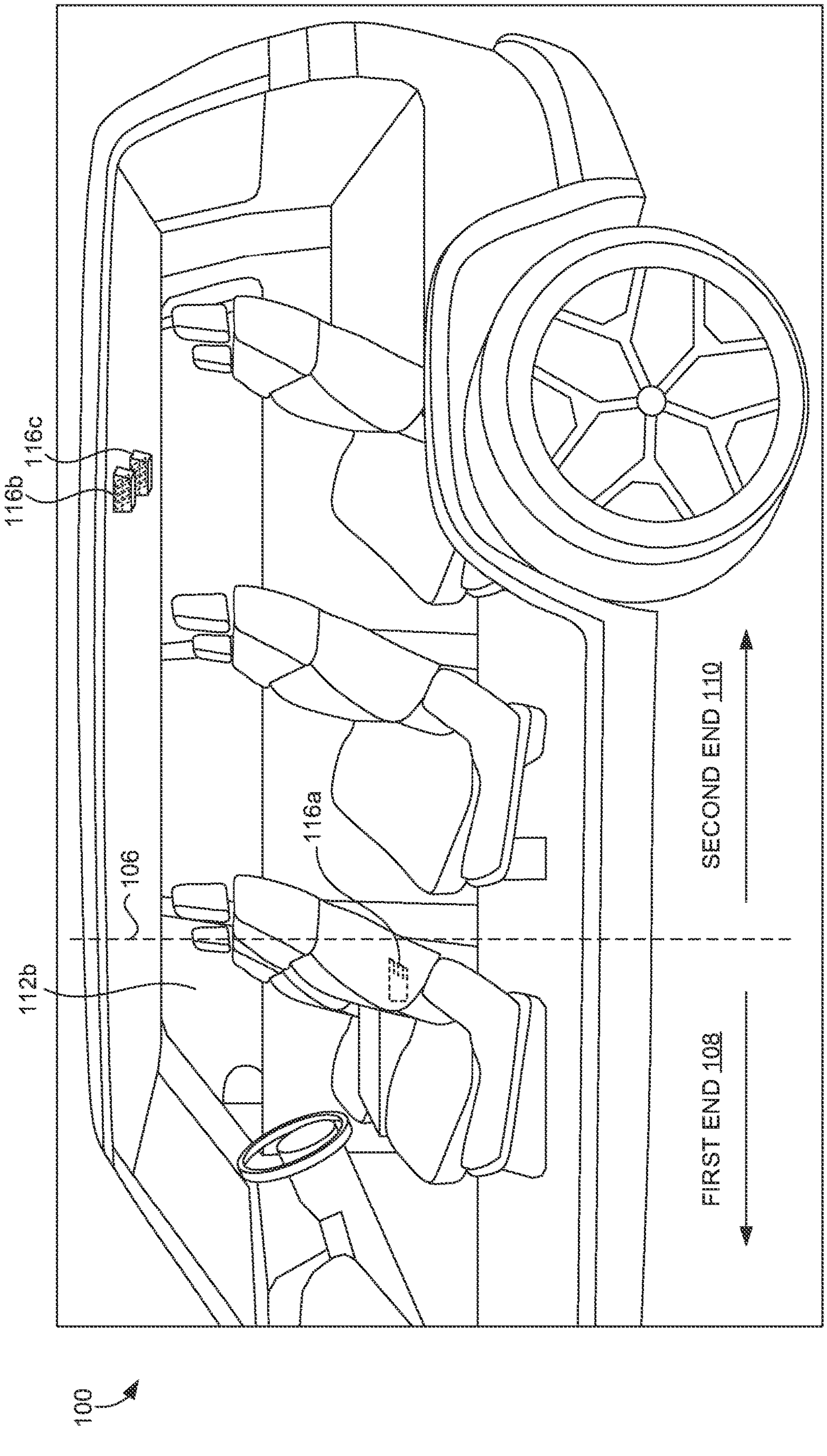
FIG. 3 is a cross-sectional side view of the vehicle of FIG. 1A, in accordance with an aspect described herein.

FIG. 3 now shows a cross-sectional side view of vehicle 100. As illustrated, vehicle 100 comprises one or more air vents, illustrated here as air vent 116*a*, air vent 116*b*, and air vent 116*c*. Air vent 116*a* is positioned proximate the midline of vehicle 100 between front aspect 102 and rear aspect 104, as described in FIG. 1A. Air vent 116*b* and air vent 116*c* are positioned within second end 110 and are relatively closer to rear aspect 104 than air vent 116*a*. It should be understood that this is just one example arrangement and other air vent arrangements comprising any number of vents in any configuration are possible.

In general, air vents, such as air vents 116*a*-116*c* are part an HVAC system for vehicle 100. The HVAC system may comprises various components not shown. In general, air vents, such as any of those described herein with reference to vehicle 100, may be configured to articulate, e.g., reposition. That is, air vents are generally suitable for directing airflow from the HVAC system, and the air vents can be moved from a first position to a second position to change the direction of airflow from the air vents. In some aspects, air vents are motorized. For instance, an air vent can be articulated from a first position to a second position using an air vent motor.

Figure 4:
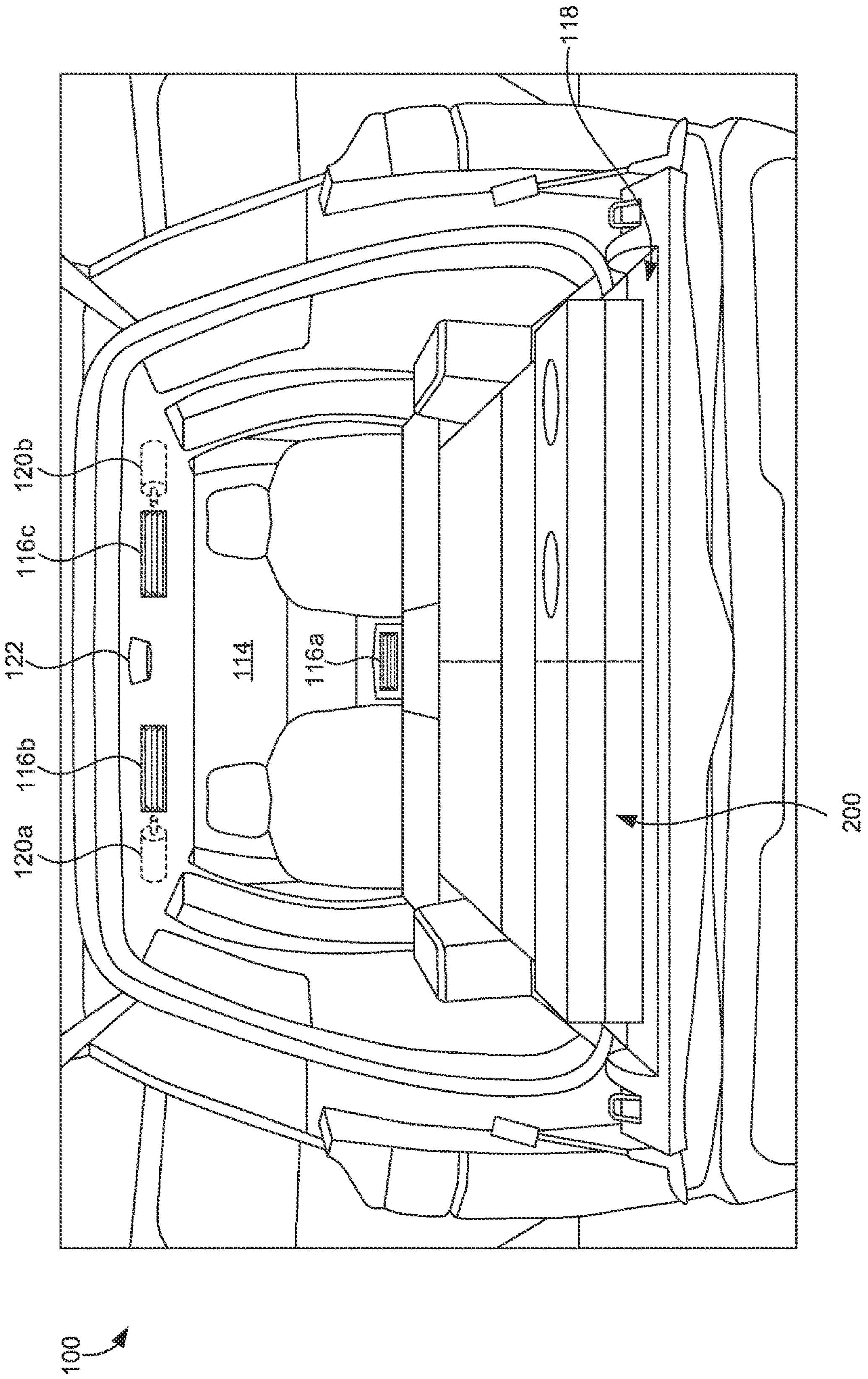
FIG. 4 is another rear view of the vehicle of FIG. 1A having an open tailgate at a rear opening, in accordance with an aspect described herein.

FIG. 4 provides a rear view of vehicle 100 having tailgate 118 in an open position such that an interior of vehicle 100 is visible via rear opening 114. In this view, air vent 116*b* and air vent 116*c* are visible and positioned at the second end of vehicle 100. In this example, each of air vent 116*b* and air vent 116*c* is respectively articulated by air vent motor 120*a* and air vent motor 120*b*. In general, an air vent motor change the position of an air vent, thereby changing the direction of the airflow from the air vent. As will be further described, air vent motors, such as air vent motor 120*a* and air vent motor 120*b*, are operationally controlled by a vehicle control system, such that the control system, through activation of the air vent motor, changes the position of the air vent and directs the airflow from it. In an aspect, an air vent can be articulated to move from a first position to a second position, where the second position directs air toward an opening of the vehicle. For instance, here, using air vent motor 120*a* and air vent motor 120*b*, each of air vent 116*b* and air vent 116*c* can be respectively positioned to direct air toward rear opening 114.

In general, air vent motors, such as air vent motor 120*a* and air vent motor 120*b*, may be any type of motor suitable for articulating air vents. Some examples include brush or brushless motors. One suitable motor is a stepper motor. Stepper motors may provide for computer controlled positioning and holding. That is, a stepper motor may be communicatively coupled to the control system, thereby allowing the control system to determine a position of the stepper motor and rotate the stepper motor to another position, thereby moving the associated air vent from the first position to the second position.

As further illustrated in FIG. 4, example vehicle 100 comprises particulate sensor 122. In general, particulate sensor 122 is suitable for detecting airborne particulates. While illustrated as positioned within the second end of vehicle 100, it should be understood, that one or more particulate sensors may be positioned anywhere within a vehicle. As will be further discussed, particulate sensor 122 may be communicatively coupled to a control system, such that the control system can receive an indication that particulates have been detected by particulate sensor 122 and take an action in response.

Some example particulate sensors suitable for use as particulate sensor 122, include, but are not limited to, particulate sensors that detect coarse particles (e.g, >10 μm), fine particles (e.g., between 10 μm and 2.5 μm), or ultrafine particles (e.g., <2.5 μm). Some particulate sensors suitable for detecting particulates in these ranges utilize infrared systems, beta attenuation systems, laser diffraction systems, and the like.

Further illustrated in FIG. 4 is cooking device 200. Cooking device 200 is a portable cooking device that may be used in conjunction with vehicle 100, and in some cases stowed as part of vehicle 100. As an example, vehicle 100 may be an electric vehicle from which cooking device 200 draws power to operate a cooking element. Some vehicles support storage and use of portable cooking devices, such as cooking device 200. In such vehicle systems, a cooking device 200 may mount to, or generally be usable at, tailgate 118. In doing so, cooking device 200 may be a source of particulates that is dispelled from the vehicle 100 using the methods and systems descried herein. In some aspects, cooking device 200 is communicatively coupled to the vehicle control system, as will be further described. While the example illustrated in FIG. 4 illustrates cooking device 200 as a possible source of particulates, it will be understood that other sources of particulates may be present, including dust sources, soot from campfires, particulates from construction sources, among many other possible sources. The technology described herein is not intended to be limited for use with only those aspects comprising a cooking device, such as cooking device 200.

As noted, particulate sensor 122 may be used to detect whether there are particulates in the interior of vehicle 100. An example of such includes particulates emitted during use of cooking device 200. An indication of the particulates or the concentration of particulates is communicated to the control system, which may take an action in response to detecting particulates or detecting a threshold concentration level of particulates in the interior. For instance, the control system may activate an HVAC system, modify an air vent position, and lower a window, among other actions.

Figure 5:
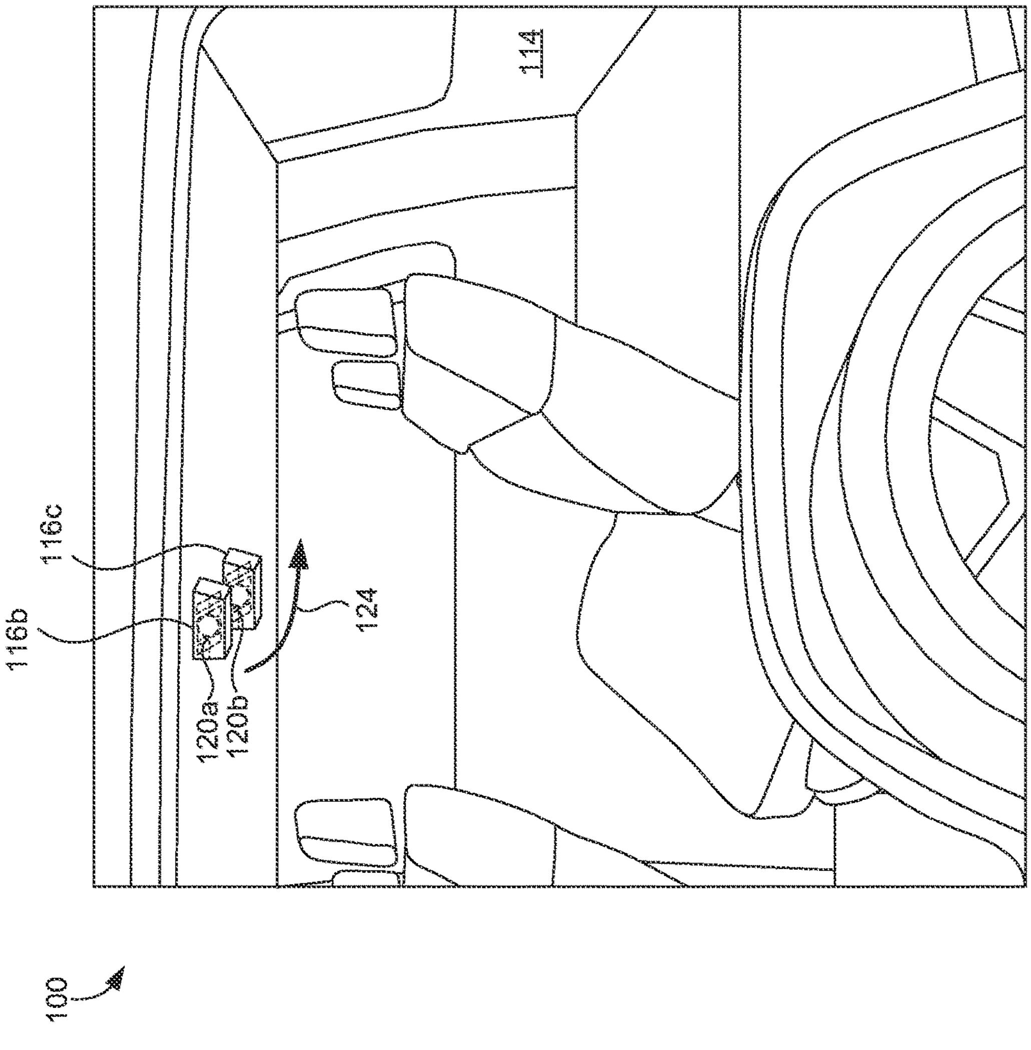
FIG. 5 is an expanded view of a portion of FIG. 1A comprising an air vent, in accordance with an aspect described herein.

To illustrate one example, FIG. 5 provides a side view of an area of vehicle 100 comprising air vent 116*b*. Here, air vent 116*b* and air vent 116*c* are being repositioned from a first position to a second position in the direction of arrow 124 using air vent motor 120*a* and air vent motor 120*b*, respectively. In this aspect, the second position directs air emitted from air vent 116*b* and air vent 116*c* toward rear opening 114. The repositioning may be done in response to detecting particulates at particulate sensor 122 of FIG. 4 and be performed by the control system of vehicle 100 operationally activating air vent motor 120*a* and air vent motor 120*b*. The example illustrated here has been shown with respect to air vent 116*b* and air vent 116*c*. However, it will be understood that any one or more of the air vents, such as air vent 116*a*, may each be positioned such that they are directing air from the air vents toward rear opening 114, or another opening of vehicle 100 from which particulates are being dispelled.

Figure 6:
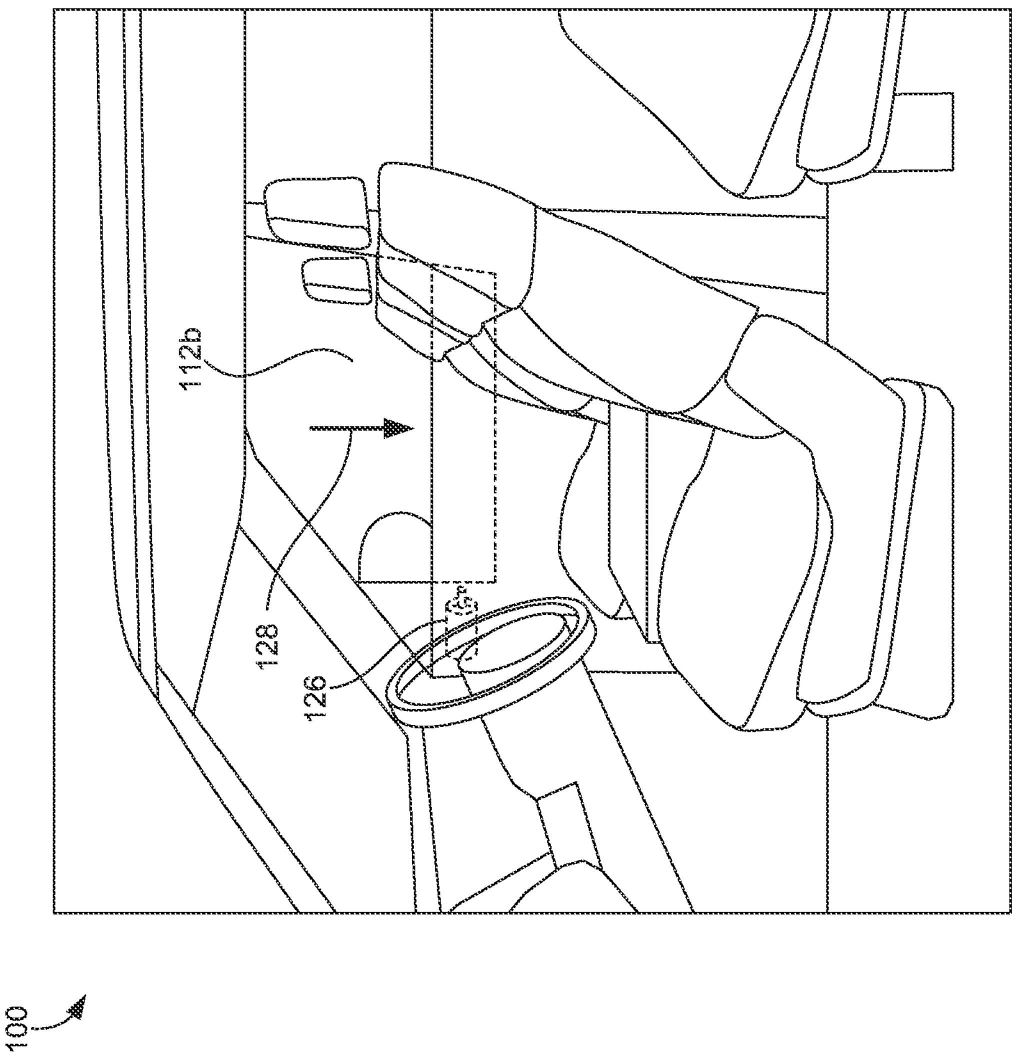
FIG. 6 is an expanded view of a portion of FIG. 1A comprising a window, in accordance with an aspect described herein.

FIG. 6 illustrates another example of an action taken by the control system in response to detecting particulates at particulate sensor 122 of FIG. 4. Here, window 112*b* is being lowered in the direction of arrow 128 by the control system. As noted, window 112*b* may be a power window, e.g., raised and lowered using window motor 126, which is operationally coupled to the control system such that activation of window motor 126 raises or lowers window 112*b*. Motors suitable for use as window motor 126 are generally understood in the industry, but one example suitable for use is a stepper motor, such as those previously described.

In this particular example, window 112*b* is at the first end of vehicle 100 opposite the second end of vehicle 100 from which the particulates are being dispelled. In general, the vehicle control system may direct air from the air vents toward an opening that is at an opposite end of the window selected for opening, which helps to create a draft through the interior toward the opening, thereby helping to dispel particulates from a vehicle. While it is illustrated that window 112*b* is lowered in response to the detection of particulates, it will be understood that this is just an example, and that any one or more windows may be opened by the control system in response to detecting particulates.

Figure 7A:
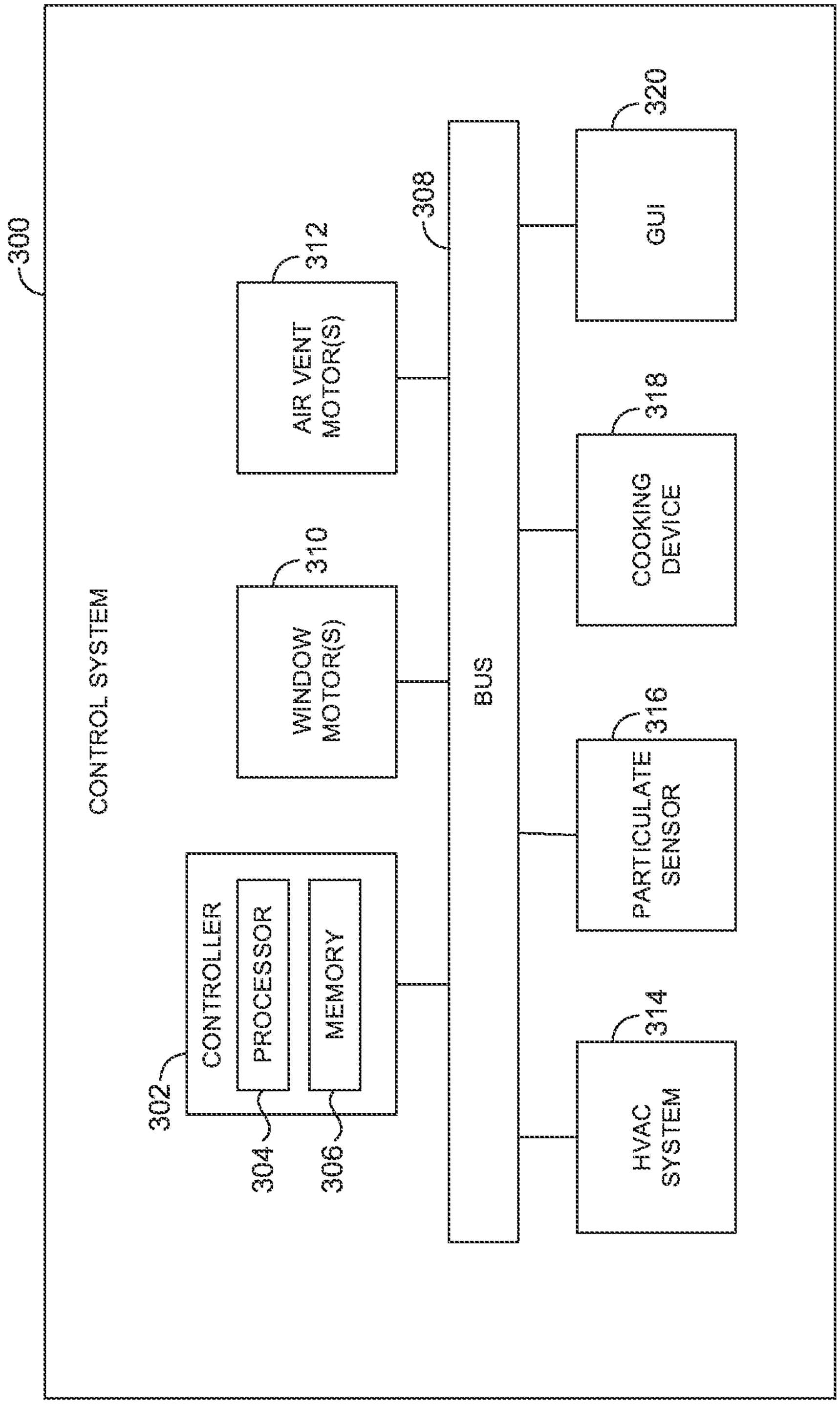
FIG. 7A is an example control system suitable for operating aspects of the present technology, in accordance with an aspect described herein.

With reference now to FIG. 7A, the figure provides an example control system 300 suitable for use with the technology described herein, including that which has been described with reference to vehicle 100.

In this example, control system 300 comprises controller 302 having processor 304 and memory 306. Memory 306 stores computer-executable instruction that can be executed by processor 304 to perform actions, such as operationally controlling window motor(s) 310, air vent motor(s) 312, and HVAC system 314, as well as communicating with particulate sensor 316 and cooking device 318. These components may correspond to, and are suitable for use as, those components of vehicle 100, along with other aspects of the technology.

As shown in FIG. 7A, control system 300 includes bus 308 that directly or indirectly couples, among other components not shown, controller 302, window motor(s) 310, air vent motor(s) 312, HVAC system 314, particulate sensor 316, cooking device 318, and graphical user interface (GUI) 320. Controller 302 is configured to operationally control components of control system 300, including physical components thereof, which for instance, may be controlled using one or more drivers stored in memory 306 and utilized by processor 304.

Bus 308 represents what can be one or more vehicle communication buses, such as, for instance, a Controller Area Network (CAN) bus, a FlexRay bus, or an Ethernet bus. It should be understood that this and other arrangements described herein are set forth only as examples. Other arrangements and elements can be used in addition to or instead of those shown, and some elements can be omitted altogether.

In an implementation of the technology, components of control system 300 may wirelessly communicate. As an example, shortwave communications methods can be used. Some examples include Wi-Fi, Bluetooth, ZigBee, and the like. Thus, while illustrated as communicating via bus 308, it should be understood that components of control system 300 can communicate with controller 302 using any wired or wireless communication method, and in any combination.

As shown in FIG. 7A, the controller 302 may comprise processor 304 and memory 306. While controller 302 is shown with a single processor 304 and a single memory 306, it should be understood that controller 302 can include any number of processors and memory. Processor 304 may comprise any type of special-purpose or general-purpose processor. Memory 306 includes computer storage media in the form of volatile or nonvolatile memory. Memory 306 may be removable, non-removable, or a combination thereof. Exemplary hardware devices for memory 306 include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store desired information and which can be accessed by components of control system 300. Memory 306 does not comprise signals per se. Processor 304 can read data from various entities such as memory 306 or other components of control system 300, including but not limited to particulate sensor 316 and cooking device 318. In some instances, memory 306 stores computer-usable instructions that are read by the processor 304 to perform functions described herein. Processor 304 and memory 306 can be separate or integrated components. Illustrative types of hardware logic components that can be used for the controller 302 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

While only a single controller 302 is shown in FIG. 7A, it should be understood that aspects of the technology described herein could include any number of controllers, which may also comprise one or more electronic control units (ECU) configured to send instructions for controlling the behavior of and receiving communications from one or more physical components of a vehicle, such as those components descried as part of control system 300. As an example, a separate controller could be provided for controlling each of the components described herein, including each of those components illustrated as part of control system 300.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, elements described herein can be implemented as discrete or distributed components or in conjunction with other components, and in any suitable combination and location. Some elements can be omitted altogether. Moreover, various functions described herein as being performed by one or more entities can be carried out by hardware, firmware, or software. For instance, various functions can be carried out by a processor executing instructions stored in memory. As such, other arrangements and elements (e.g., machines, interfaces, functions, orders, and groupings of functions) can be used in addition to or instead of those shown.

In general, control system 300 operationally controls or receives communications from the various components of control system 300, communicating via bus 308 or a wireless communication method. For instance, controller 302 communicates with window motor(s) 310 to activate window motor(s) 310, thereby opening or closing a window associated with window motor(s) 310. Controller 302 communicates with air vent motor(s) 312 to activate air vent motor(s) 312, thereby moving an air vent associated with air vent motor(s) 312 between at least a first position and a second position.

Controller 302 communicates with HVAC system 314 to activate HVAC system 314. As noted, HVAC system 314 may comprises various components that move air through a vehicle to air vents, where the air is directionally blown into an interior of the vehicle. An example is HVAC system 150 illustrated and described with respect to FIG. 1B. For instance, controller 302 may activate a blower, compressor, heating element, or any other HVAC system component to move air to any of the vehicle's air vents and into the interior of the vehicle.

Controller 302 communicates with particulate sensor 316 to determine whether there are particulates, including determining whether there is a threshold level of particulates, present within the interior of the vehicle. Controller 302 communicates with cooking device 318. As an example, controller 302 may receive from cooking device 318 an indication whether a heating element or other component of cooking device 318 is active.

In aspects, controller 302 may communicate with or control any of window motor(s) 310, air vent motor(s) 312, HVAC system 314, particulate sensor 316, or cooking device 318, among other components, in response to inputs received at GUI 320. In general, GUI 320 provides an interface, e.g., a touch screen display, that can be used as an input component for sending instructions to controller 302. For instance, in response to receiving inputs, such as touch inputs, at GUI 320, controller 302 may lower or raise windows using window motor(s) 310, articulate air vents using air vent motor(s) 312, blow heated or cooled air through HVAC system 314, activate or read from particulate sensor 316, and activate or otherwise control cooking device 318. GUI 320 may also perform as an output component, e.g, a display. For instance, window position, air vent position, HVAC status, particulate concentration, or cooking device status are a few example outputs that may be provided using GUI 318.

Figure 7B:
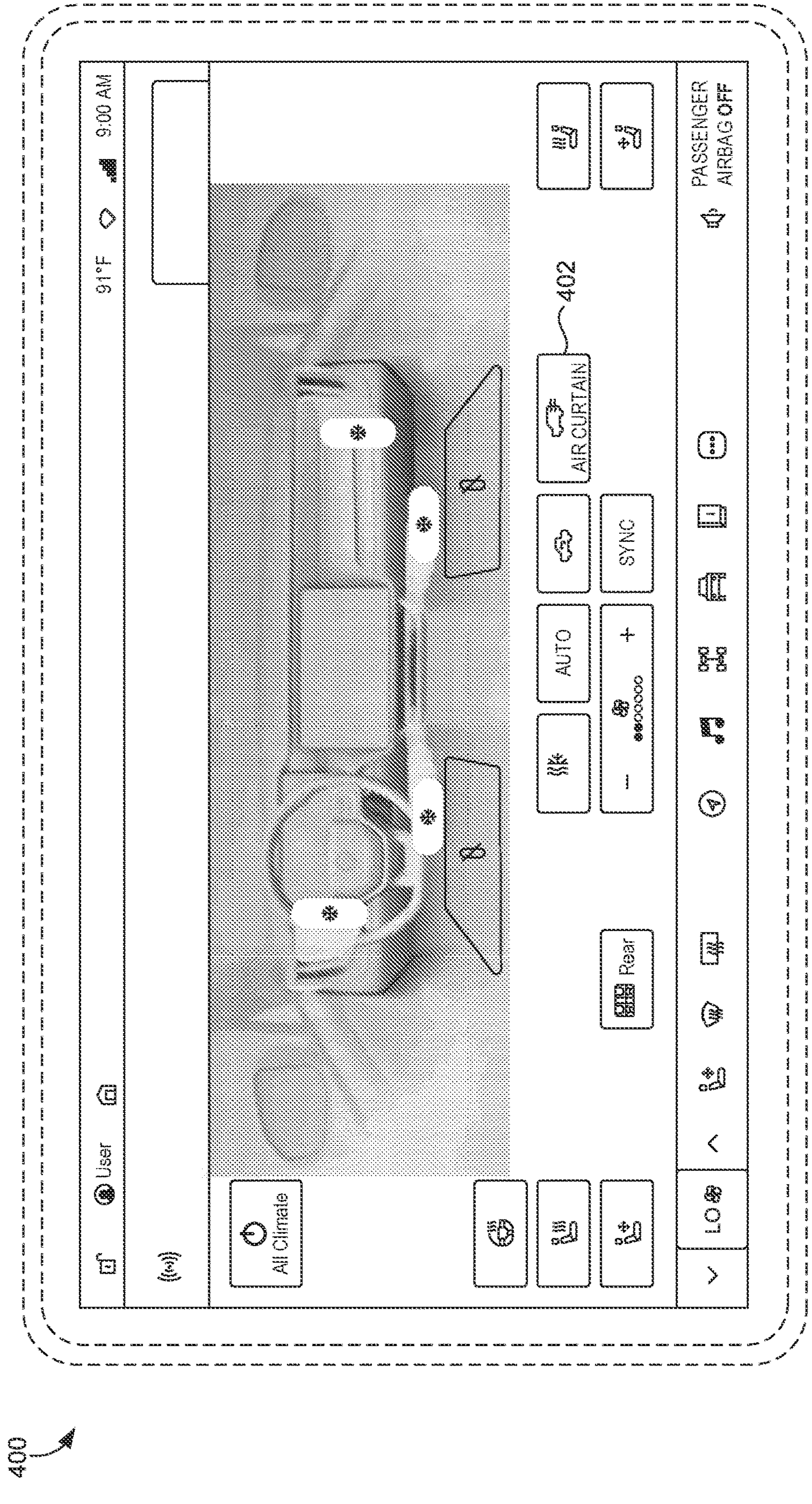
FIG. 7B is an example graphical user interface (GUI) suitable for interfacing with aspects of the described technology, in accordance with an aspect described herein.

With brief reference to FIG. 7B, GUI 400 is illustrated to provide one example GUI that may be displayed using a display device, which as noted, may further serve as an input/output component for a controller, such as controller 302 of FIG. 7A. GUI 400 is one example suitable as GUI 318, previously described. GUI 400 comprises input option 402 that activates an "air curtain." For instance, by selecting input option 402, an HVAC system may be activated to blow air into the interior of the vehicle. In an aspect, selection of input option 402 opens a rear opening, such as a rear window, hatch, door, or the like. In an aspect, selection of input option 402 at least partially lowers a window located at an end of the vehicle opposite that of the rear opening. In an aspect, selection of input option 402 articulates vents in the direction of the rear opening, or another opening of the vehicle, such as any of the windows described herein, so as to expel particulates from within the vehicle. In an aspect, input option 402 becomes a selectable option in response to a particulate sensor detecting particulate matter above a threshold level. Any and all combinations of these events may occur in response to selecting input option 402.

Figure 8:
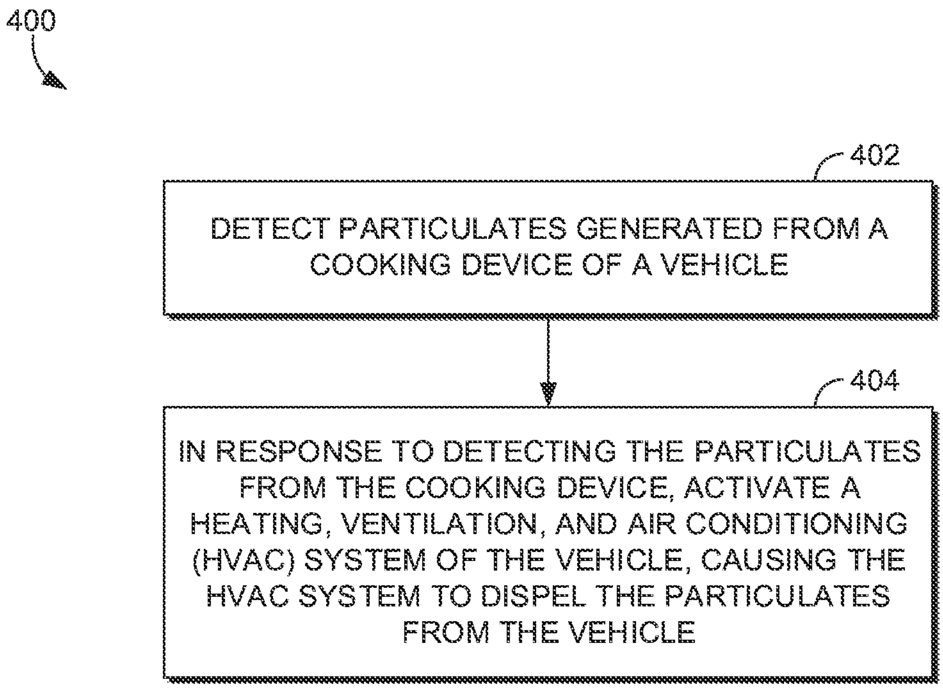
FIG. 8 is an example method for dispelling particulates from a vehicle using a control system, in accordance with an aspect described herein.

FIG. 8 is an example method 400 of dispelling particulates from a vehicle. Method 400 may be performed by a control system of a vehicle, such as control system 300.

Vehicle 100 is an example system suitable for use. In aspects, the method is a computer-implemented method performed by a processor, such as processor 304 executing instructions on computer-storage media, such as memory 306.

At block 402, particulates are detected. The particulates may be detected by a particulate sensor, such as particulate sensor 122, disposed within a vehicle. In some cases, a threshold concentration of particulates is detected. The control system may detect particulates by receiving an indication from the particulate sensor that the particulate sensor has detected airborne particulates or a threshold concentration of particulates in the vehicle's interior air.

In an aspect, the particulates are emitted as part of a cooking process using a cooking device, such as cooking device 200. The cooking device may be disposed on a tailgate or other area proximate a rear opening. In this case, particulates may enter the vehicle through the rear opening when the cooking device is in use.

At block 404, an HVAC system is activated. The HVAC system may be activated by the control system. The HVAC system may be activated by the control system in response to detecting the particulates at block 402. When the HVAC system is active, the HVAC system distributes air to one or more air vents of the vehicle, where the one or more air vents direct airflow into the interior of the vehicle.

As a result of activating the HVAC system at block 404, the air introduced into the vehicle via the air vents induces a positive air pressure within the vehicle relative to external ambient air. That is, the air pressure of the air within the vehicle is greater than the ambient air outside of the vehicle. This causes air within the vehicle to flow out of an opening in the vehicle. In a particular case, the rear opening is open and the air flows out of the rear opening at a location proximate the cooking device. As vehicle air from within the interior of the vehicle is flowing out of the opening, such as the rear opening, airborne particulates are dispelled from within the vehicle. Further, the constant flow of air from the vehicle out of the opening helps to prevent external ambient air comprising particulates from entering the vehicle.

In some aspects, the control system may further at least partially open a window, such as any of those described with reference to FIG. 1A, including window 112*a* or window 112*b*, among others. The control system may at least partially open the window in response to detecting particulates. To do so, the control system may activate a window motor associated with the window that is being opened. In an aspect, the control system selects a window to open based on the selected window being at an end of the vehicle opposite that of an opening from which the particulates are being dispelled. As an example, the window being opened by the control system may be positioned at a first end of the vehicle that is opposite a second end of the vehicle. The second end of the vehicle comprises the rear opening. As an example, a cooking device may be positioned at the second end of the vehicle and be a source of particulates. As such, the air is moved toward the rear opening, which helps to dispel particulates from within the vehicle and prevent particulates from the cooking device from entering the vehicle at the rear opening.

In some aspects, the control system may modify an air vent position of an air vent within the vehicle. The control system may modify the air vent position in response to detecting particulates. To do so, the control system activates an air vent motor associated with the air vent. The air vent motor moves the air vent from a first position to a second position. In doing so, the control system redirects airflow from the air vent. In a particular case, the air vent is moved to the second position, at which the air vent directs air toward an opening from which particulates are being dispelled. This could be the rear opening for example, such as when the cooking device proximate the rear opening is being used. By repositioning one or more of the air vents so that airflow is directed toward the opening, the airflow aids in removing particulates from the vehicle, while also serving to prevent additional particulates from entering the vehicle at the opening.

Figure 9:
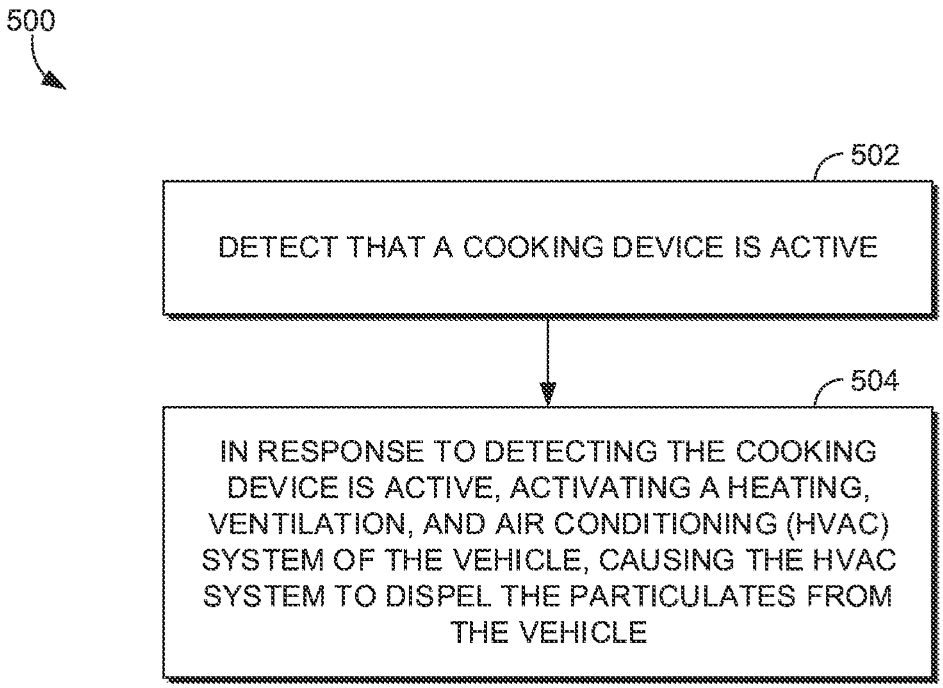
FIG. 9 is another example method for dispelling particulates from a vehicle using a control system, in accordance with an aspect described herein.

FIG. 9 is another example method 500 of dispelling particulates from a vehicle. Method 500 may be performed by a control system of a vehicle, such as control system 300. Vehicle 100 is an example system suitable for use. In aspects, the method is a computer implemented method performed by a processor, such as processor 304 executing instructions on computer-storage media, such as memory 306.

At block 502, the control system detects that a cooking device, such as cooking device 200, is active. For instance, detecting that the cooking device is active may include receiving an indication from the cooking device that a heating element of the cooking device is activate. In another aspects, the indication that the cooking device is active is received by the cooking device in response to an input made at the cooking device indicating the cooking device is active and causing the cooking device to communicate the indication to the control system. The input may be received at an input component, e.g., button, switch, touchscreen, or the like, associated with the cooking device or via a computer-based application controlling functions of the cooking device.

At block 504, an HVAC system is activated by the control system. The HVAC system may be activated by the control system in response to detecting the cooking device is active. When the HVAC system is active, the HVAC system distributes air to one or more air vents of the vehicle, where the one or more air vents direct airflow into the interior of the vehicle.

As a result of activating the HVAC system at block 504, the air introduced into the vehicle via the air vents induces a positive air pressure within the vehicle relative to external ambient air, thereby causing air to flow out of the vehicle at an opening, such as a rear opening, dispelling particulates, and further helping to prevent particulates, such as those emitted from a cooking device proximate the opening, from entering into the interior of the vehicle.

As in manners similar to other methods, the control system may further open a window or position an air vent of the vehicle to aid in dispelling particulates and preventing them from entering the interior of the vehicle.

Figure 10:
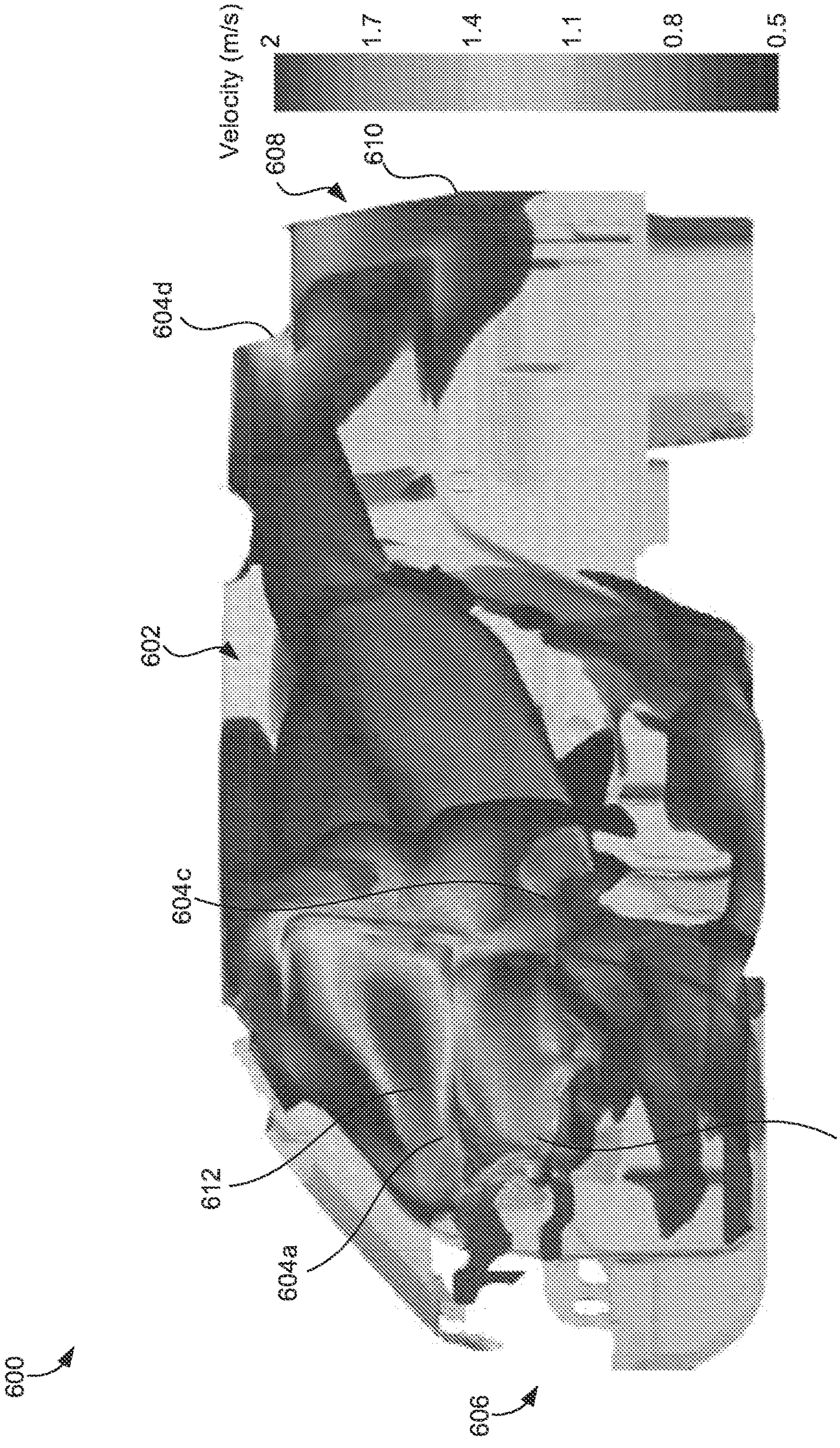
FIGS. 10-12 illustrate example airflow diagrams determined using an aspect of the present technology, in accordance with aspects described herein.
Figure 11:
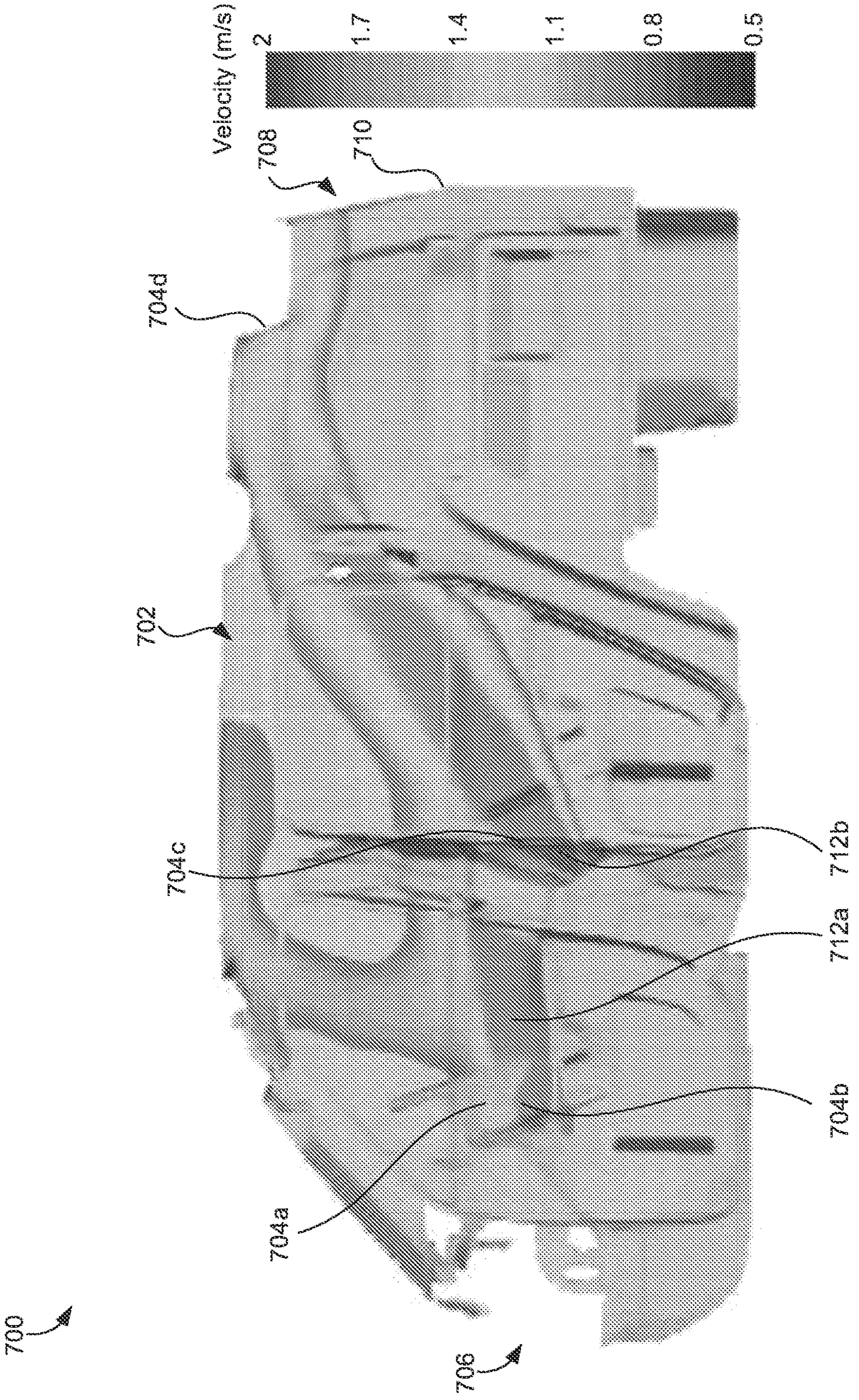
Figure 12:
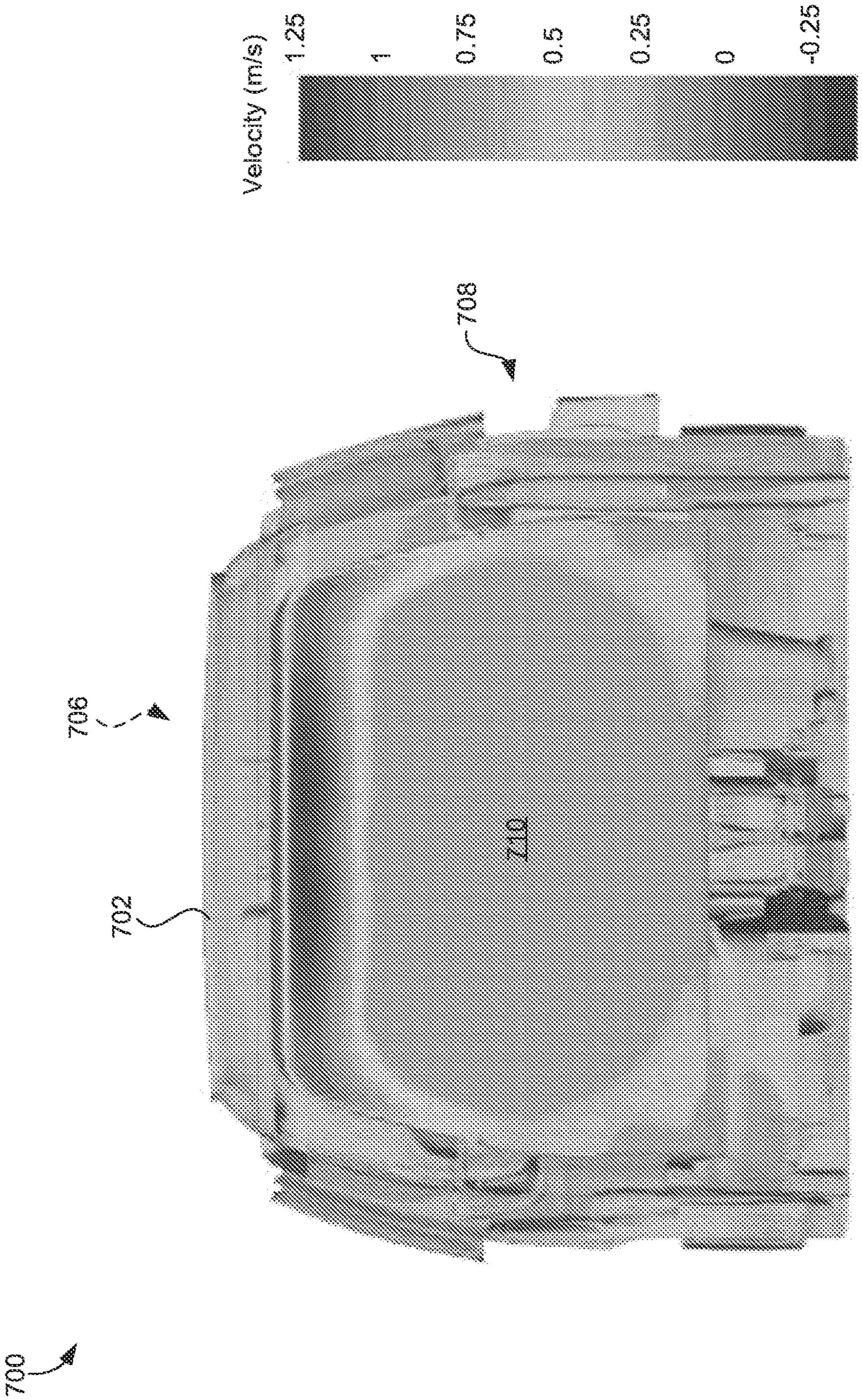

Referring now to FIGS. 10-12, the figures illustrate example airflow diagrams. The airflow diagrams comprise images of airflow rates, in meters per second (m/s), using aspects of the technology, such as those having been previously described.

In particular, turning first to FIG. 10, airflow diagram 600 is a side view of a vehicle 602 having an activated HVAC system. Vehicle 602 may correspond to vehicle 100 of FIG. 1. Vehicle 602 comprises air vents at locations 604*a-d*. These are directing air from the HVAC system into the interior of vehicle 602. As illustrated, the air is moving from a first end 606 to a second end 608 having an open rear opening 610. In doing so, particulates within are dispelled through rear opening 610. Air 612 illustrates air supplied by the HVAC system into vehicle 602.

FIG. 11 provides airflow diagram 700. Vehicle 702 may correspond to vehicle 100 of FIG. 1. Here air vents are provided at locations 704*a*-704*d* and have been positioned to direct air in the direction of open rear opening 710. As such, the airflow is illustrated moving from first end 706 to second end 708. In doing so, particulates within are dispelled through rear opening 710. Air 712*a* and 712*b* illustrate air supplied by the HVAC system into vehicle 702.

FIG. 12 illustrates a rear view of vehicle 702 provided in airflow diagram 700 of FIG. 11. As illustrated, due to the positive air pressure within vehicle 702, vehicle air is flowing from within vehicle 702 through rear opening 710, thereby dispelling airborne particulates within vehicle 702, while at the same time, helping to prevent particulates from entering vehicle 702 at rear opening 710.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms “step” or “block” might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as “a” and “an,” unless otherwise indicated to the contrary, include the plural as well as the singular. Thus, for example, the constraint of “a feature” is satisfied where one or more features are present. Furthermore, the term “or” includes the conjunctive, the disjunctive, and both (a or b thus includes either a or b, as well as a and b).

Terms, such as “having,” “including,” or the like, and derivatives thereof, are intended to have the same broad meaning as “comprising,” unless otherwise expressly indicated.

The word “accessing,” and derivatives thereof, comprises “receiving,” “referencing,” “retrieving,” and the like. Further, the word “communicating” has the same broad meaning as the word “receiving” or “transmitting” facilitated by software or hardware-based buses, receivers, or transmitters using communication media described herein, unless otherwise expressly indicated.

Unless explicitly indicated otherwise, ranges are intended to provide example embodiments that are suitable for some aspects and implementations. They are not intended to exclude other embodiments of the technology having values falling outside of the given ranges.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects that can be practice from the foregoing description include the following:

Aspect 1: A method comprising: detecting particulates generated from a cooking device of a vehicle; and in response to detecting the particulates from the cooking device, activating a heating, ventilation, and air conditioning (HVAC) system of the vehicle, causing the HVAC system to dispel the particulates from the vehicle.

Aspect 2: Aspect 1, wherein the cooking device is positioned at a rear of the vehicle, and the HVAC system dispels the particulates from a rear opening of the vehicle.

Aspect 3: Any of Aspects 1-2, wherein air supplied by the HVAC system induces positive air pressure within the vehicle relative to external ambient air, thereby causing vehicle air comprising the particulates to flow out of the vehicle.

Aspect 4: Any of Aspects 1-3, further comprising, in response to detecting the particulates, at least partially opening a window of the vehicle.

Aspect 5: Aspect 4, wherein the window opened in response to detecting the particulates is positioned at a first end of the vehicle, the first end of the vehicle being opposite a second end of the vehicle, wherein the cooking device is located at the second end of the vehicle.

Aspect 6: Any of Aspects 1-5, further comprising modifying, in response to detecting the particulates, an air vent position of an air vent of the vehicle.

Aspect 7: Aspect 6, wherein the modified air vent position directs air supplied by the HVAC system in a direction of a window opening.

Aspect 8: A vehicle comprising: a heating, ventilation, and air conditioning (HVAC) system; and a control system configured to: detect particulates generated from a cooking device; and in response to detecting the particulates, activate the HVAC system, wherein the activation causes the HVAC system to dispel the particulates from the vehicle.

Aspect 9: Aspect 8, wherein the cooking device is positioned at a rear of the vehicle, and the HVAC system dispels the particulates from a rear opening of the vehicle.

Aspect 10: Any of Aspects 8-9, wherein air supplied by the HVAC system induces positive air pressure within the vehicle relative to external ambient air, thereby causing vehicle air comprising the particulates to flow out of the vehicle.

Aspect 11: Any of Aspects 8-10, wherein the control system is further configured to, in response to detecting the particulates, at least partially open a window of the vehicle.

Aspect 12: Aspect 11, wherein the window opened in response to detecting the particulates is positioned at a first end of the vehicle, the first end of the vehicle being opposite a second end of the vehicle, wherein the cooking device is located at the second end of the vehicle.

Aspect 13: Any of Aspects 8-12, wherein the control system is further configured to modify an air vent position of an air vent of the vehicle in response to detecting particulates.

Aspect 14: Aspect 13, wherein the modified air vent position directs air supplied by the HVAC system in a direction of a window opening.

Aspect 15: Computer storage media storing computer-readable instructions thereon that, when executed by a processor, cause the processor to perform operations comprising: detecting particulates generated from a cooking device of a vehicle; and in response to detecting the particulates from the cooking device, activating a heating, ventilation, and air conditioning (HVAC) system of the vehicle, wherein activating the HVAC system dispels the particulates from the vehicle.

Aspect 16: Aspect 15, wherein the cooking device is positioned at a rear of the vehicle, and the HVAC system dispels the particulates from a rear opening of the vehicle.

Aspect 17: Any of Aspects 15-16, wherein air supplied by the HVAC system induces positive air pressure within the vehicle relative to external ambient air, thereby cause vehicle air comprising the particulates to flow out of the vehicle.

Aspect 18: Any of Aspects 15-17, wherein the operations further comprise, in response to detecting the particulates, at least partially open a window of the vehicle.

Aspect 19: Aspect 18, wherein the window opened in response to detecting the particulates is positioned at a first end of the vehicle, the first end of the vehicle being opposite a second end of the vehicle, wherein the cooking device is located at the second end of the vehicle.

Aspect 20: Any of Aspects 15-19, wherein the operations further comprise modifying an air vent position of an air vent of the vehicle, and wherein the modified air vent position directs air supplied by the HVAC system in a direction of a window opening of the vehicle.

What is claimed is:

1. A method comprising:

detecting particulates generated from a cooking device of a vehicle; and in response to detecting the particulates from the cooking device, activating a heating, ventilation, and air conditioning (HVAC) system of the vehicle, causing the HVAC system to dispel the particulates from the vehicle, and modifying, in response to detecting the particulates, an air vent position of an air vent of the vehicle, wherein the modified air vent position directs air supplied by the HVAC system in a direction of a window opening.

2. A vehicle comprising:

a heating, ventilation, and air conditioning (HVAC) system; and a control system configured to:

detect particulates generated from a cooking device; and in response to detecting the particulates, activate the HVAC system, wherein:

the activation causes the HVAC system to dispel the particulates from the vehicle;

the cooking device is positioned at a rear of the vehicle, and the HVAC system dispels the particulates from a rear opening of the vehicle;

the control system is further configured to modify an air vent position of an air vent of the vehicle in response to detecting the particulates; and the modified air vent position directs air supplied by the HVAC system in a direction of a window opening.

3. The vehicle of claim 2, wherein air supplied by the HVAC system induces positive air pressure within the vehicle relative to external ambient air, thereby causing vehicle air comprising the particulates to flow out of the vehicle.

4. The vehicle of claim 2, wherein the control system is further configured to, in response to detecting the particulates, at least partially open a window of the vehicle.

5. The vehicle of claim 4, wherein the window opened in response to detecting the particulates is positioned at a first end of the vehicle, the first end of the vehicle being opposite a second end of the vehicle, wherein the cooking device is located at the second end of the vehicle.

* * * * *